US007215249B2

(12) United States Patent
Carrender et al.

(10) Patent No.: US 7,215,249 B2
(45) Date of Patent: May 8, 2007

(54) RADIO FREQUENCY IDENTIFICATION READER

(75) Inventors: Curtis L. Carrender, Morgan Hill, CA (US); Donald F. Speirs, Placitas, NM (US)

(73) Assignee: Alien Technology Corporation, Morgan Hill, CA (US)

( * ) Notice: Subject to any disclaimer, the term of this patent is extended or adjusted under 35 U.S.C. 154(b) by 135 days.

(21) Appl. No.: 10/993,668

(22) Filed: Nov. 19, 2004

(65) Prior Publication Data

US 2005/0156039 A1 Jul. 21, 2005

Related U.S. Application Data

(60) Provisional application No. 60/523,867, filed on Nov. 19, 2003.

(51) Int. Cl.
*G08B 13/14* (2006.01)
(52) U.S. Cl. .................. 340/572.1; 340/572.2
(58) Field of Classification Search ............ 340/572.1, 340/572.2, 572.4, 572.7, 551
See application file for complete search history.

(56) References Cited

U.S. PATENT DOCUMENTS

| 4,853,692 | A  | * | 8/1989 | Wolk et al. ............... 340/572.1 |
| 5,349,332 | A  | * | 9/1994 | Ferguson et al. ......... 340/572.2 |
| 6,838,989 | B1 | * | 1/2005 | Mays et al. ............... 340/572.1 |
| 6,867,687 | B2 | * | 3/2005 | Turner ..................... 340/572.2 |
| 6,903,656 | B1 | * | 6/2005 | Lee ......................... 340/572.1 |
| 7,043,269 | B2 | * | 5/2006 | Ono et al. ................ 340/572.1 |

FOREIGN PATENT DOCUMENTS

| EP | 0 710 853 A2 | 5/1996 |
| EP | 1 164 533 A1 | 12/2001 |
| WO | WO 01/82213 A2 | 11/2001 |

OTHER PUBLICATIONS

Young, Andrew, et al., Design Of A Multi-Bunch BPM For The Next Linear Collider, DIPAC 2001 Proceedings—ESRF, Grenoble, 3 pages.
Power Dividers And Directional Couplers, https://ewhdbks.mugu.navy.mil/couplers.htm, 6 pages.
PCT Notification Of Transmittal Of The International Search Report And The Written Opinion Of The International Searching Authority, Or The Declaration, for PCT International Appln. No. US2004/039031, mailed Aug. 5, 2005, (9 pages total).

(Continued)

*Primary Examiner*—John Tweel, Jr.
(74) *Attorney, Agent, or Firm*—Blakely, Sokoloff, Taylor & Zafman LLP (57) ABSTRACT

Radio Frequency Identification (RFID) readers with a directional coupler. At least one embodiment of the present invention provides an RFID reader designed to use a directional coupler to receive signals from an antenna which is connected to a radio frequency source of the reader to transmit signals. The directional coupler samples the signals received at the antenna and provides the received signal to a receiver of the RFID reader. In one example, the receiver of the RFID reader compares a portion of the signals from the radio frequency source with the received signal from the directional coupler to receive data from RF tags.

6 Claims, 7 Drawing Sheets

OTHER PUBLICATIONS

PCT Notification Concerning Transmittal of Copy of International Preliminary Report on Patentability (Chapter 1 of the PCT) and International Preliminary Report on Patentability for PCT/US2004/039031, mailed on Jun. 1, 2006 (7 pages).

Article entitled "Mini-Circuits, Directional Couplers" dated Sep. 8, 1999.

Article entitled "Directional Couplers Lumped Element & Stripline 100kHZ to 65 GHz General Information" dated Mar. 21, 1996, MERRIMAC, West Caldwell, NJ.

* cited by examiner

RADIO FREQUENCY IDENTIFICATION READER

This application claims the benefit of U.S. Provisional Patent Application No. 60/523,867, filed on Nov. 19, 2003, which is hereby incorporated herein by reference; this application claims the benefit of the provisional's filing date under 35 U.S.C. § 119(e).

FIELD OF THE TECHNOLOGY

The invention relates to the field of devices for reading an identifier, such as Tags with radio frequency identifications (RFID).

BACKGROUND

Multiple wireless Tags can be interrogated by sending from an interrogating transmitter (e.g., a Reader) a code and having information transmitted by the Tag in response. This is commonly accomplished by having the Tag listen for an interrogation message and for it to respond with a unique serial number and/or other information. The Tags typically have limited power available for transmitting data wirelessly to the Reader. It is desirable to extend the range of wireless Tags so that it is not necessary to bring each Tag close to a Reader for reading.

Conventional RFID readers are typically designed to use one of three general approaches to transmit signals to and receive signals from one or more tag, including a single-channel homodyne technique, a two-antenna bi-static technique, and a technique to use a circulator device.

Figure 4:
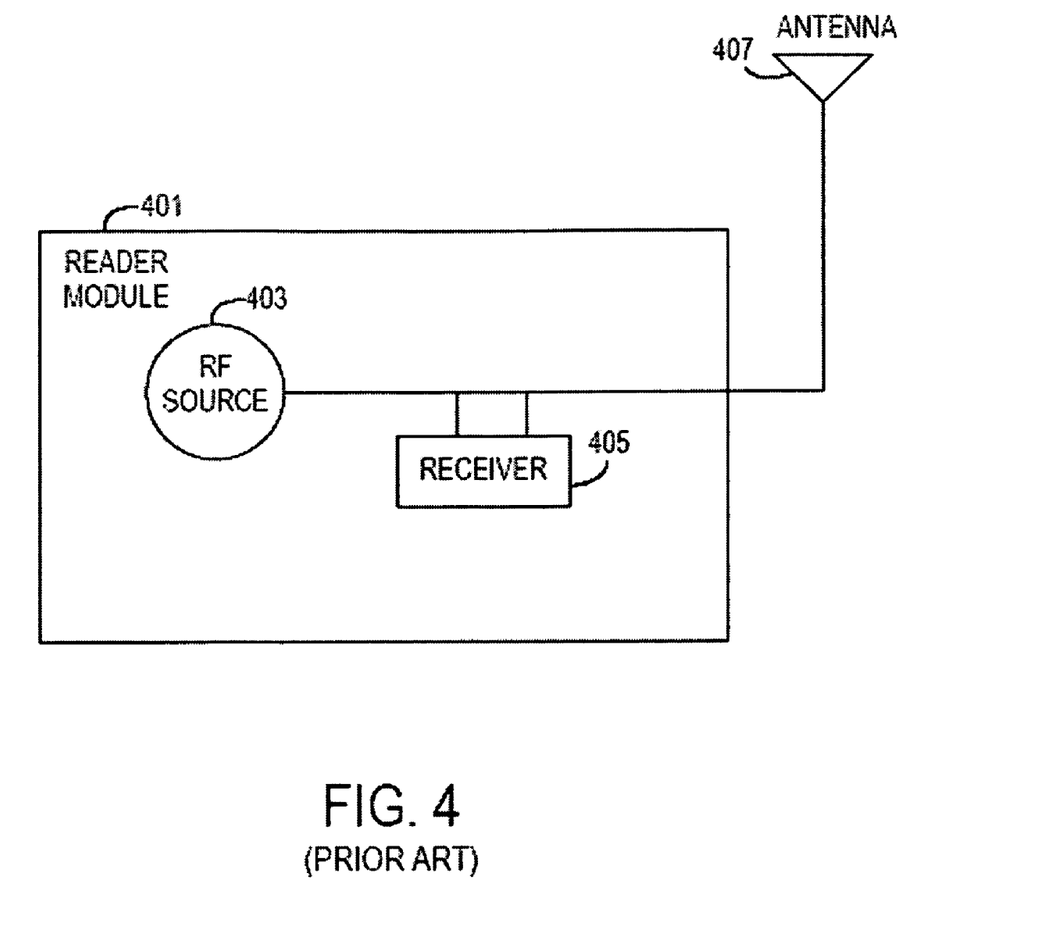
FIGS. 4–6 illustrate examples of traditional RFID Reader modules.

FIG. 4 shows one standard approach for an RFID reader to read a beam-powered tag in which a homodyne receiver is used. The term "homodyne receiver" refers to the fact that there is but a single channel for both the transmitted signal and the received signal and a direct down conversion of the data to baseband. This technique of a homodyne receiver is quite common and has the advantage of simplicity. It has the disadvantage of creating noise and lower sensitivity if it is not perfectly tuned. For example, the reader module 401 in FIG. 4 has an antenna 407 coupled to both a radio frequency (RF) source 403 and a receiver 405. Using the signal from the frequency source 403, the receiver 405 directly down converts the data received from the antenna 407.

Figure 5:
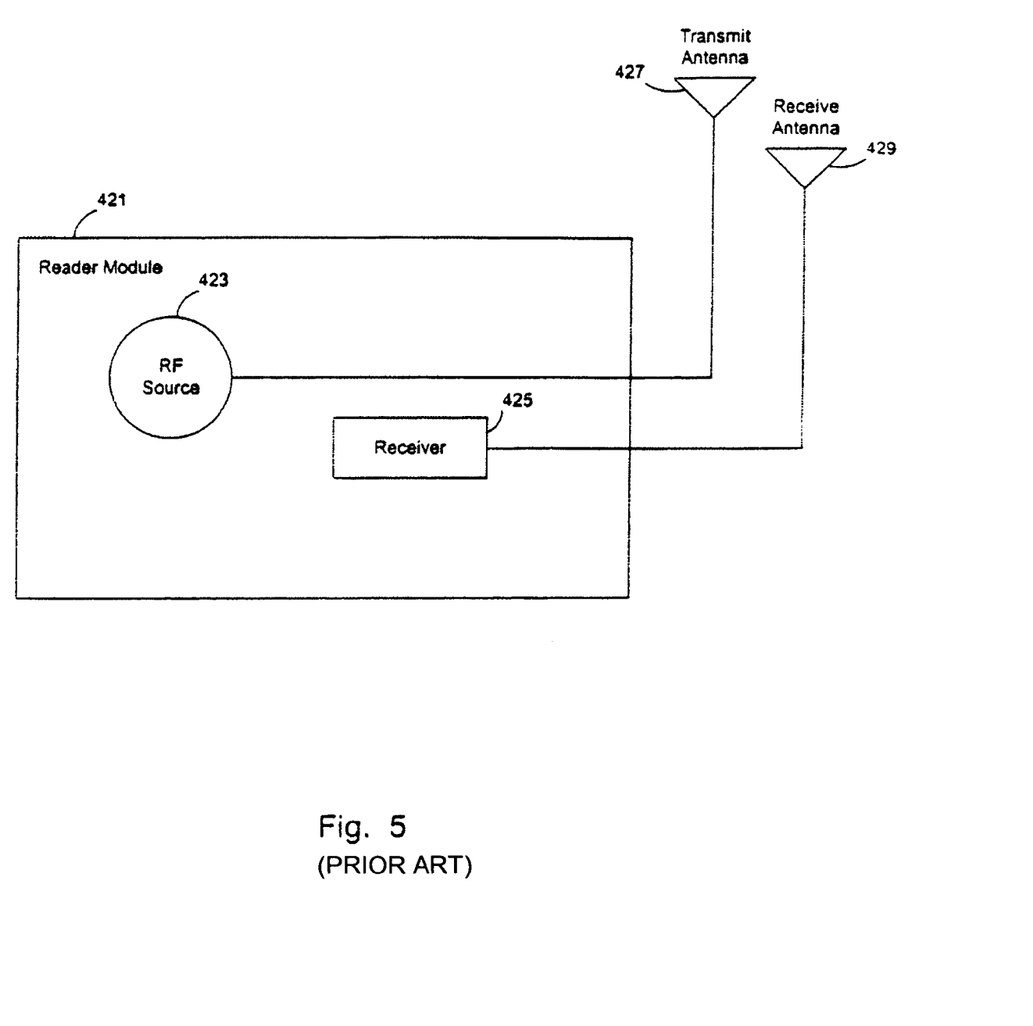

FIG. 5 shows an approach of a bi-static design where a separate antenna is used for both transmit and receive. For example, a reader module 421 in FIG. 5 has a radio frequency source 423 coupled to its own antenna 427 to transmit signals and a receiver 425 coupled to its own antenna 429 to receive signals. This technique of bi-static design has at least two disadvantages. First, there is the added cost of two antennas instead of one. Since microwave antennas of some gain are expensive, the added cost of an additional antenna can be a major problem. Secondly, there is a requirement to have both antennas overlapping in pattern.

Figure 6:
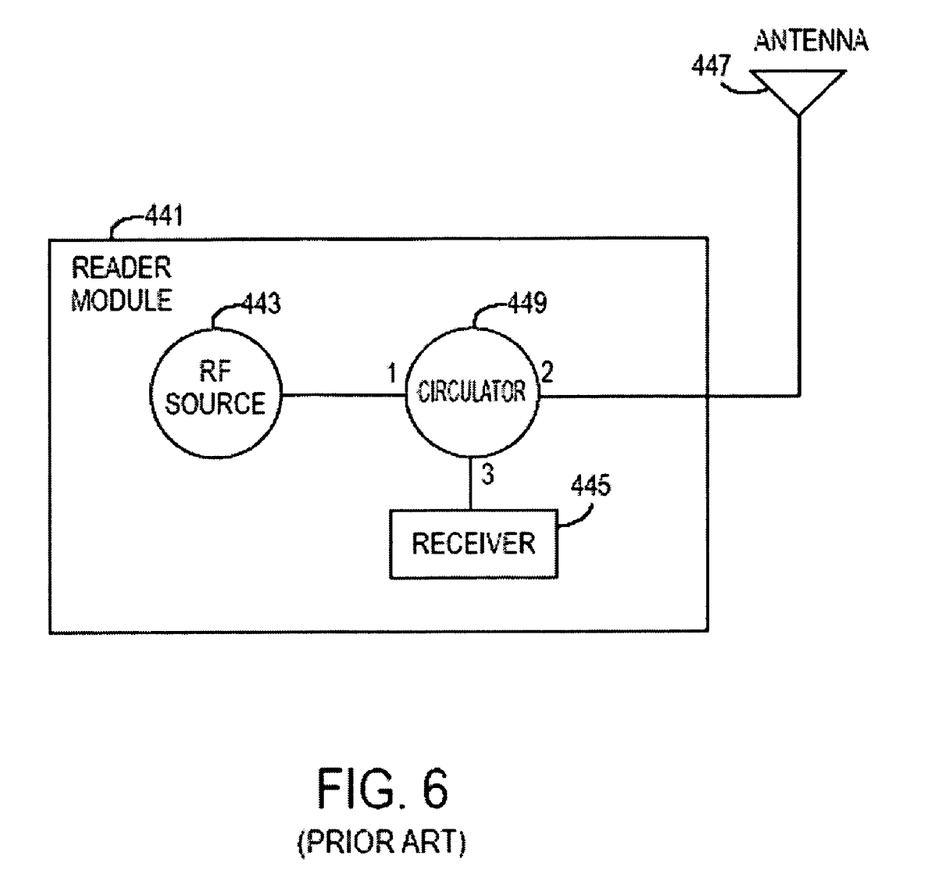

FIG. 6 shows a conventional technique to have a circulator in the reader to separate the incoming signal (to receive) from the outgoing signal (to transmit). A circulator couples the powers in a preferred direction so that the receiver retains backscatter information and the transmitter powers the tag. For example, the reader module 441 in FIG. 6 has a circulator 449 which couples power in a preferred direction, forward for transmit and power, and to the receiver for the receive or reflected portion. Power to the tag passes through to antenna 447 and received power from the tag is channeled toward the receiver block after being reflected by the tag. In FIG. 6, the circulator 449 couples port 2 to port 1 to transmit signals and couples port 2 to port 3 to receive signals. This approach also is quite common but has the disadvantage of requiring the circulator that is an expensive device.

SUMMARY OF THE DESCRIPTION

Radio Frequency Identification (RFID) readers with a directional coupler are described here.

At least one embodiment of the present invention provides an RFID reader designed to use a directional coupler to receive signals from an antenna which is connected to a radio frequency source of the reader to transmit signals. The directional coupler selectively channels the signals received at the antenna and provides the received signal to a receiver of the RFID reader. In one example, the receiver of the RFID reader compares a portion of the signals from the radio frequency source with the received signal from the directional coupler to receive data from RF tags.

Other features of the present invention will be apparent from the accompanying drawings and from the detailed description which follows.

DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Figure 7:
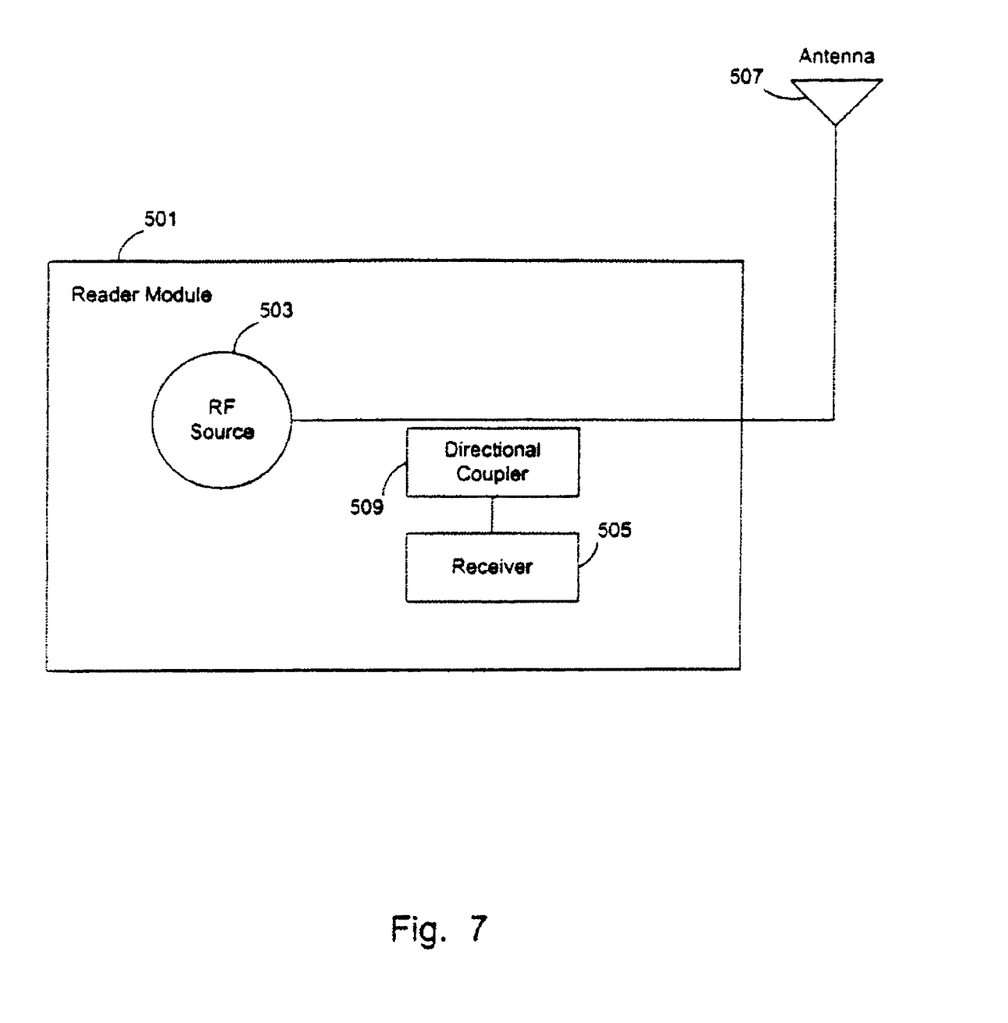
FIG. 7 illustrates an example of an RFID Reader according to one embodiment of the present invention.

At least one embodiment of the present invention uses a directional coupler in a reader. A directional coupler is a transmission coupling device for separately sampling (e.g., through a known coupling loss) either the forward or the backward wave in a transmission line. A directional coupler may be used to sample either a forward or backward wave in a transmission line. For example, FIG. 7 shows a reader module 501 with a directional coupler 509. In FIG. 7, a radio frequency source 503 is connected to an antenna 507 to transmit signals. The directional coupler 509 is used to sample the received signals. For example, when communicating with RF tags that modulate and reflect the signals transmitted from the reader, the directional coupler 509 samples the signals reflected back from the RF tags for the receiver 505. In such an approach, the receiver portion of the reader compares a portion of the transmitted signal to that of the received signal to detect the data sent by one or more Tags. The received signal is coupled into the receiver through the directional coupler. Thus, no expensive circulators are needed in RFID readers when directional couplers are used. In one embodiment of the present invention, a reader module 501 operates in a somewhat similar manner as reader module 441 except that the receiver 505 of the reader module 501 receives the input signal from the directional coupler while the receiver 445 of the reader module 441 receives the input signal from the circulator. A directional coupler (e.g., a microwave coupler) can be built with stripline design approaches known in the art with only copper trace material. Thus, the cost involved is primarily related to the area used on the board for the directional coupler.

Figure 1:
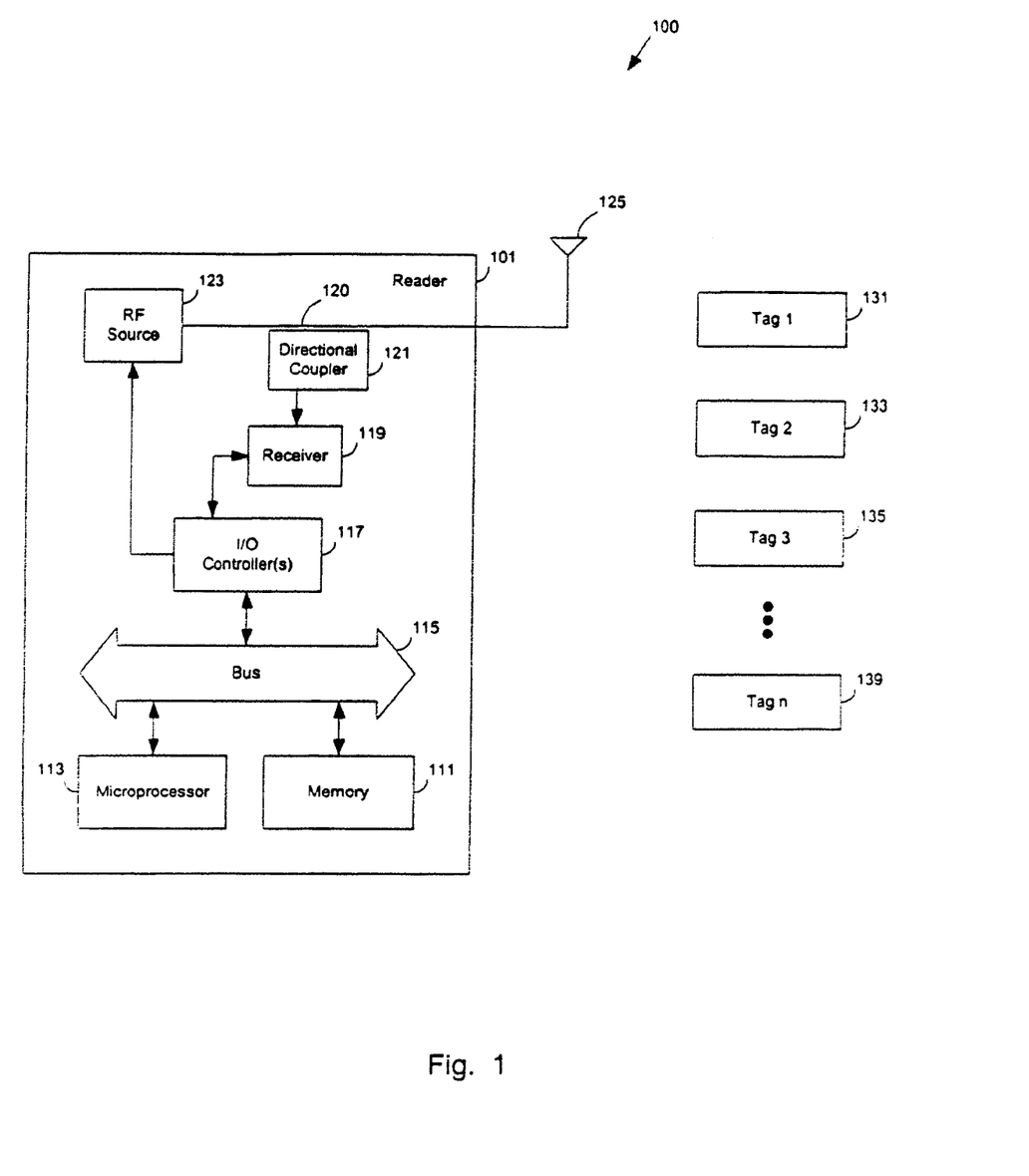
FIG. 1 shows an example of an identification system which includes a Reader and a plurality of RF Tags according to one embodiment of the present invention.

FIG. 1 illustrates an example of an identification system 100 which includes a Reader 101 and a plurality of Tags 131, 133, 135, . . . , and 139. The system is typically a Reader-talks-first RF ID system using either passive or semi-passive active backscatter transponders as Tags. The incorporation of a battery and/or memory into a Tag is an expanded feature to facilitate longer read range; however, the use of the battery does require certain trade-offs, such as higher costs, limited longevity, larger form factor, greater weight, and end-of-life disposal requirements. Thus, the Tags 131–139 may have memory and/or a battery or may have neither of these elements. It will be appreciated that different types of Tags may be mixed in a system where a Reader is interrogating Tags with batteries and Tags without batteries. There are at least 4 classes of Tags which may be used with the present invention: (1) no power source on the Tag except for power which is obtained from the Tag's antenna, but the Tag does include a read-only memory which has the Tag's identification code; (2) a Tag without internal power, but when powered from the Reader, can write data to non-volatile memory in the Tag; this type of Tag also includes memory for storing the identification code; (3) a Tag with a small battery to provide power to the circuitry in the Tag. Such a Tag may also include non-volatile memory as well as memory for storing the Tag's identification code; (4) a Tag which can communicate with each other or other devices by transmitting rather than reflecting.

FIG. 1 shows an example of an identification system which includes a Reader and a plurality of RF Tags according to one embodiment of the present invention. The Reader 101 includes a receiver 119 and a radio frequency (RF) source 123, each of which are coupled to an I/O (input/output) controller 117. The RF source 123 is connected to antenna 125 through line 120. The receiver 119 receives signals using the antenna 125 through a directional coupler 121 on line 120. The directional coupler 121 and line 120 isolate a large portion of the transmitted signals from the RF source 123 from the received signals for the receiver 119. The receiver 119 and the RF source 123 may be similar to conventional receiver and RF source units found in current Readers. The receiver and RF source typically operate, in North America, in a frequency range of about 900 megahertz, each coupled to the I/O controller 117 which controls the receipt of data from the receiver and the transmission of data, such as commands, from the RF source 123. The I/O controller is coupled to a bus 115 which is in turn coupled to a microprocessor 113 and a memory 111. There are various different possible implementations which may be used in the Reader 101 for the processing system represented by elements 117, 115, 113, and 111. In one implementation, the microprocessor 113 is a programmable microcontroller, such as an 8051 microcontroller or other well-known microcontrollers or microprocessors (e.g. a PowerPC microprocessor) and the memory 111 includes dynamic random access memory and a memory controller which controls the operation of the memory; memory 111 may also include a non-volatile read only memory for storing data and software programs. The memory 111 typically contains a program which controls the operation of the microprocessor 113 and also contains data used during the processing of Tags as in the interrogation of Tags. In one embodiment, the memory 111 would typically include a computer program which causes the microprocessor 113 to send search commands through the I/O controller to the RF source and to receive responses from the Tags through the directional coupler 121 and the receiver 119 and through the I/O controller 117. The Reader 101 may also include a network interface, such as an Ethernet interface, which allows the Reader to communicate to other processing systems through a network. The network interface would typically be coupled to the bus 115 so that it can receive data, such as the list of Tags identified in an interrogation from either the microprocessor 113 or from the memory 111.

Figure 2:
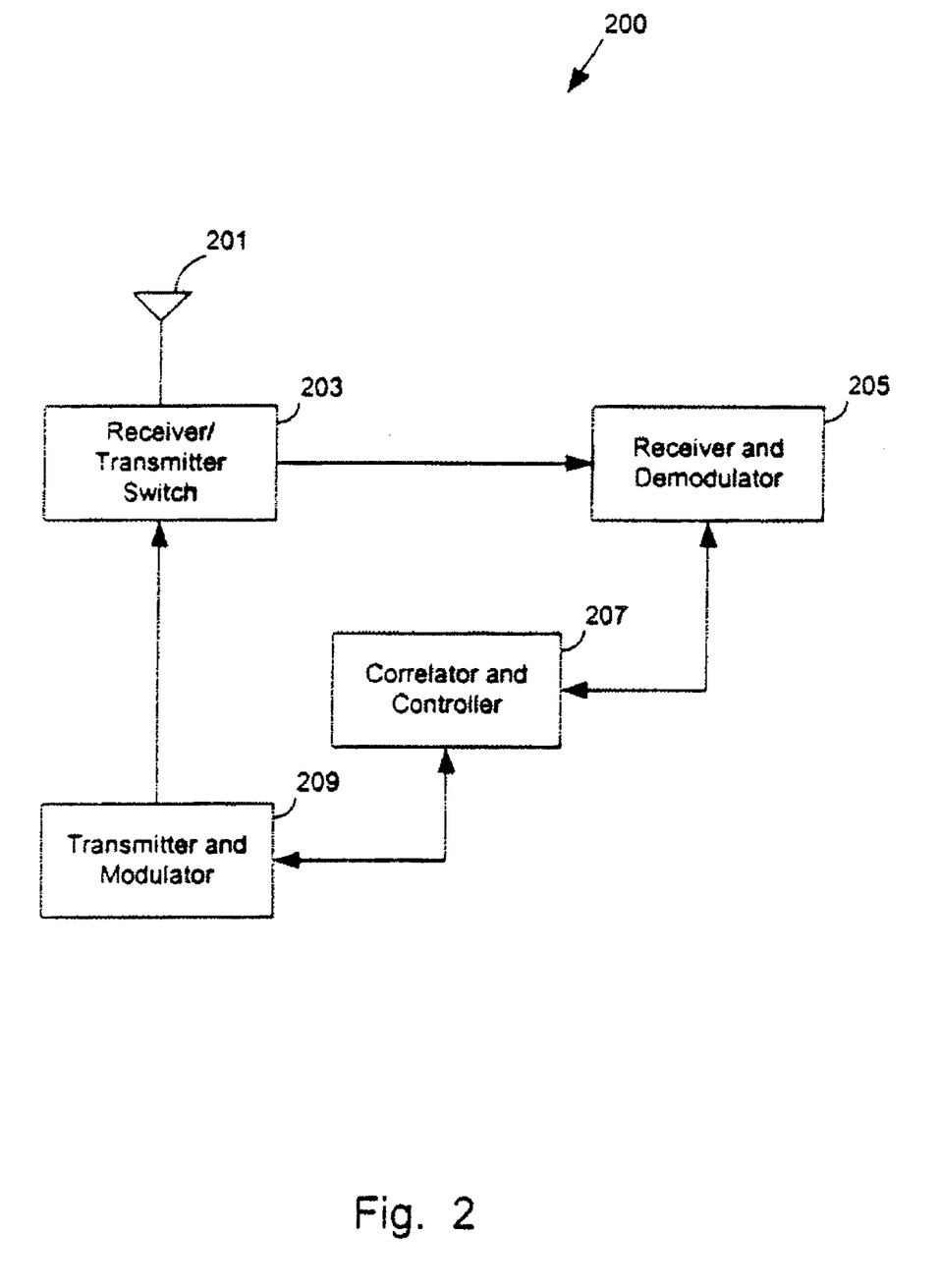
FIGS. 2–3 show examples of RF Tags which may communicate with the Readers according to at least one embodiment of the present invention.

FIG. 2 shows an example of one implementation of a Tag which may be used with the present invention. The Tag 200 includes an antenna 201 which is coupled to a receive/transmit switch 203. This switch is coupled to the receiver and demodulator 205 and to the transmitter and modulator 209. A correlator and controller unit 207 is coupled to the receiver and demodulator 205 and to the transmitter 209. The particular example shown in FIG. 2 of a Tag may be used in various embodiments in which a memory for maintaining data between commands is maintained in the Tag and in which a bit by bit correlation occurs in the Tag. The receiver and demodulator 205 receives signals through the antenna 201 and the switch 203 and demodulates the signals and provides these signals to the correlator and controller unit 207. Commands received by the receiver 205 are passed to the controller of the unit 207 in order to control the operation of the Tag. Data received by the receiver 205 is also passed to the control unit 207, and this data may include parameters for a query command and handshake data from a handshake command in the embodiments described below. The transmitter 209, under control of the control unit 207, transmits responses or other data through the switch 203 and the antenna 201 to the Reader. It will be appreciated by those in the art that the transmitter may be merely a switch or other device which modulates reflections from an antenna, such as antenna 201.

To achieve Tag cost low enough to enable ubiquitous use of Tags in the supply chain, the Tags may be designed with properties, such as small Integrated Circuit (IC) area to permit low cost, small memory, precise timing not required, atomic transactions to minimize Tag state storage requirements and others. Such Tags can be produced at low cost. However, other Tag designs can also be used.

Figure 3:
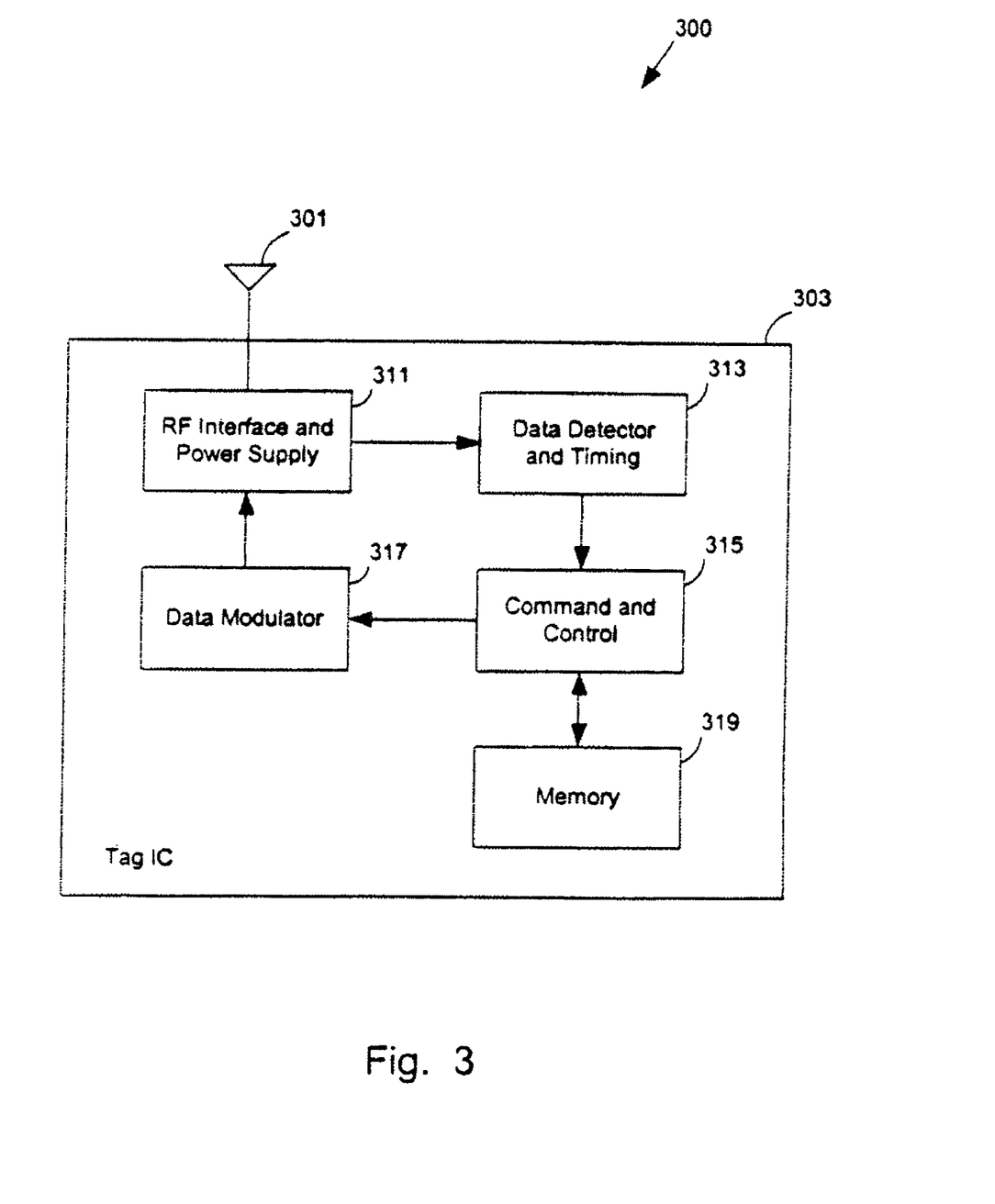

FIG. 3 shows an example of a VLC (Very Low Cost) Tag 300 which includes an antenna 301 and an integrated circuit 303, connected together. The Tag IC 303 implements the command protocol and contains the ePC (Electronic Product Code). The antenna 301 receives the Reader interrogation signals and reflects the interrogation signal back to the Reader in response to a modulation signal created by the IC 303. The Tag IC 303 implements the VLC Tag by combining an RF interface and power supply 311, data detector and timing circuit 313, command and control 315, data modulator 317 and memory 319. The command and control 315 includes static logic which implements the communication protocol.

The RF Interface and Power Supply 311 converts the RF energy into the DC power required for the Tag IC 303 to operate, and provides modulation information to the Data Detector and Timing circuit 313. The RF interface also provides a means of coupling the Tag modulation signals to the antenna for transmission to the Reader. The Data Detector and Timing circuit 313 de-modulates the Reader signals and generates timing and data signals used by the command and control 315. The command and control 315 coordinates all of the functions of the Tag IC 303. The command and control 315 may include state logic to interpret data from the Reader, perform the required internal operations and determines if the Tag will respond to the Reader. The command and control 315 implements a state diagram and communications protocol. The memory 319 contains the ePC code of the item Tagged by a VLC Tag. The data modulator 317 translates the binary Tag data into a signal that is then applied to the RF Interface 311 and then transmitted to the Reader (e.g., Reader 101).

In one embodiment of the invention, a Tag may be fabricated through a fluidic self-assembly process. For example, an integrated circuit may be fabricated with a plurality of other integrated circuits in a semiconductor wafer. The integrated circuit will include, if possible, all the necessary logic of a particular RF Tag, excluding the antenna 301. Thus, all the logic shown in the Tag 300 would be included on a single integrated circuit and fabricated with similar integrated circuits on a single semiconductor wafer. Each circuit would be programmed with a unique identification code and then the wafer would be processed to remove each integrated circuit from the wafer to create blocks which are suspended in a fluid. The fluid is then dispersed over a substrate, such as a flexible substrate, to create separate RF Tags. Receptor regions in the substrate would receive at least one integrated circuit, which then can be connected with an antenna on the substrate to form an RF Tag. An example of fluidic self-assembly is described in U.S. Pat. No. 5,545,291.

In one implementation of the present invention, system communication follows a two-stage command-reply pattern where the Reader initiates the transaction (Reader Talks First, RTF). In the first phase, the Reader provides power to one or more passive Tags with continuous wave (CW) RF energy. Tags power up, ready to process commands after one command which is used for synchronization of its clocks. The Reader transmits information to the field by amplitude modulation using a Reader-to-Tag encoding scheme. On completion of the transmission, the Reader ceases modulation and maintains RF to power the Tags during the reply phase. Tags communicate with the Reader via backscatter modulation during this period.

The readers according to embodiments of the present inventions can be used with various RFID Tags, such as class I, class II, and class III RFID Tags. In one embodiment, the RF transport layer for the communication between the Reader and the Tags involves UHF operations. For example, the communication protocol can be modulated in a carrier signal of a frequency from 400 MHz to 2.45 GHz.

There are at least four classes of Tags for different applications and cost requirements. Tags of different classes that meet the requirements of all of the design layers are able to work together. Tags may also include a standardized wired I/O interface to sensors, clocks, displays and other devices.

Class I Tags are simple passive, read-only backscatter Tags, designed for lowest cost production. Class I Tags have a one-time programmable memory, write once identity memory, 64 or 96 bit ePC Code, and optional recycling code.

Class II Tags are passive backscatter Tags with higher functionality and cost than Class I. In addition to the Class I features, Class II Tags: can write and read data into and out of Tags, have read-write memory, may have battery power for non-communication purposes, and optionally have sensors and data loggers.

Class-III Tags semi-passive backscatter Tags. In addition to class II features, class III Tags have built-in battery or other energy source to support increased read range.

Class IV Tags are modem-like semi-passive or active (transmitter) Tags that can wirelessly communicate with each other and/or other devices.

In one embodiment of the present invention, an RFID reader with a directional coupler modulates the RF carrier signal to transmit commands. Upon completion of the transmission of the commands, the Reader ceases modulation and maintains RF to power the Tags during the reply phase. Tags communicate with the Reader via backscatter modulation during this period. The RF carrier signal without modulation is transmitted through the antenna of the RFID reader. The RFID reader uses the same antenna to receive the RF signal back from the Tags. In one embodiment, the directional coupler samples the transmission line, through which the Reader sends the RF signal without modulation to the antenna of the RFID reader to power the Tags, to obtain RF signal back from the Tags. A receiver of the RFID reader uses the signals sampled from the directional coupler to detect the backscatter modulation.

More information about a directional coupler may be found at https://ewhdbks.mugu.navy.mil/couplers.htm, titled "Power Dividers and Directional Couples."

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency identification (RFID) Reader to query one or more Tags, the Reader comprising:
   a radio frequency (RF) source coupled to an antenna through a transmission line to transmit signals;
   a directional coupler coupled with the transmission line to selectively sample a received signal received through the antenna; and
   a receiver coupled to the directional coupler, the receiver decoding data modulated on the received signal.

2. The Reader of claim 1, wherein the directional coupler is of a stripline design.

3. The Reader of claim 2, wherein the directional coupler comprises conductive trace material.

4. The Reader of claim 3, wherein the conductive trace material comprises copper.

5. The Reader of claim 1, wherein the radio frequency (RF) source generates RF signal without modulation which is transmitted through the antenna to power one or more RF Tags, while the directional coupler samples the received signal received through the antenna from the one or more RE Tags.

6. The Reader of claim 1, wherein the receiver compares a portion of the signals from the radio frequency (RF) source with the received signal to decode the data.

* * * * *